(12) United States Patent
Marinko

(10) Patent No.: US 10,721,906 B2
(45) Date of Patent: Jul. 28, 2020

(54) PET WASTE DISPOSAL DEVICE

(71) Applicants: Dusan Marinko, Bardejov (SK);
Dusan Marinko, Jr., Bardejov (SK)

(72) Inventor: Dusan Marinko, Bardejov (SK)

(73) Assignees: Dusan Marinko, Bardejov (SK);
Dusan Marinko, Jr, Bardejov (SK)

( * ) Notice: Subject to any disclaimer, the term of this patent is extended or adjusted under 35 U.S.C. 154(b) by 375 days.

(21) Appl. No.: 15/579,317

(22) PCT Filed: Aug. 26, 2015

(86) PCT No.: PCT/SK2015/050010
§ 371 (c)(1),
(2) Date: Dec. 4, 2017

(87) PCT Pub. No.: WO2017/034485
PCT Pub. Date: Mar. 2, 2017

(65) Prior Publication Data
US 2018/0168121 A1 Jun. 21, 2018

(30) Foreign Application Priority Data

Aug. 25, 2015 (SK) .............................. 50081-2015 U

(51) Int. Cl.
*A01K 1/01* (2006.01)
(52) U.S. Cl.
CPC ............ *A01K 1/011* (2013.01); *A01K 1/0107* (2013.01); *A01K 1/0103* (2013.01)

(58) Field of Classification Search
CPC ..... A01K 1/011; A01K 1/0107; A01K 1/0103
See application file for complete search history.

(56) References Cited

U.S. PATENT DOCUMENTS 5,085,174 A    2/1992   Etkin

FOREIGN PATENT DOCUMENTS

| CH | 662243 A5 | 9/1987 |
| EP | 0 852 111 A1 | 7/1998 |
| EP | 2 735 224 A1 | 5/2014 |
| EP | 2 859 790 A2 | 4/2015 |
| FR | 2 821 239 A1 | 8/2002 |

OTHER PUBLICATIONS

International Search Report of PCT/SK2015/050010, dated Mar. 31, 2016.

*Primary Examiner* — Jessica B Wong
(74) *Attorney, Agent, or Firm* — Collard & Roe, P.C.

(57) ABSTRACT

The pet waste disposal device has a stabilization pillar mounted in a protection frame. The bottom part of the pillar is fitted with a pheromone reservoir and the top part of the protection frame is fitted with an absorption pad and then a filtration pad. At the bottom of the frame, permeable openings are located, which are used to drain the filtered urine and the rainwater in the surrounding areas. Underneath the filtration pad, a probe is located, which checks the level of filtration pad contamination and signals the need to replace the filtration pad. The pillar is fitted with a frame with a container, in which a poop bag is attached. The pillar is also fitted with a supply bin, a feature used to fasten the leash to the pillar, and a pet waste scooper.

1 Claim, 2 Drawing Sheets

PET WASTE DISPOSAL DEVICE

CROSS REFERENCE TO RELATED APPLICATIONS

This application is the National Stage of PCT/SK2015/050010 filed on Aug. 26, 2015, which claims priority under 35 U.S.C. § 119 of Slovakian Application No. PUV50081-2015 filed on Aug. 25, 2015, the disclosures of which are incorporated by reference. The international application under PCT article 21 (2) was published in English.

FIELD OF THE INVENTION

The present invention relates to a construction design of pet waste disposal device intended primarily for dogs and/or cats.

PRIOR ART

At present, many people walk their pets outdoors, in open places and parks near residential houses. These areas are fouled with poop and urine and it is only up to the pet owners, whether or not they will clean up after their pets. Animals leave a lot of excrements behind on such places and the resulting smell in the surrounding areas is very unpleasant. Disease-carrying germs dangerous to humans can also spread and multiply. Some municipalities are trying to solve the problem via installing containers with dog poop bags.

SUMMARY OF THE INVENTION

The shortcomings listed above can be eliminated by the technical solution according to the present utility model. The pet waste disposal device comprises a stabilization pillar mounted in a protection frame. The bottom part of the pillar is fitted with a pheromone reservoir, which attracts the animals to the device. The top part of the protection frame is fitted with an absorption pad; underneath the absorption pad, at the bottom part of the stabilization pillar, a filtration pad is located, which eliminates disease-carrying germs and decreases the PH of urine. At the bottom of the frame, the permeable openings are located, which are used to drain the filtered urine and the rainwater in the surrounding areas. Underneath the absorption pad, a probe is located, which checks the level of filtration pad contamination and signals the need to replace the filtration pad. The pillar is fitted with a frame with a container, in which a poop bag is attached. The bag is placed in a container to make sure that the bag will not tear. The bag is placed on the frame in such a way, that the bag itself provides a covering, which ensures that neither rain nor snow can get into the bag. The pillar is also fitted with a supply bin filled with bags and protection gloves. Mounted to the pillar is a feature used to fasten the leash to the pillar with a possibility to lock it down. The pillar is equipped with a pet waste scooper, which is attached to the pillar by a fairly long connective wire. In the top part of the pillar, a plate is located, which can be used for advertising or placing information. Above the plate, a solar panel is located, which is connected to the batteries and lighting units used to illuminate the pet waste disposal device and the access road/path or sidewalk, or background illumination of advertising board or information pictogram. The solar panel also serves as a roof, which traps and drains the rainwater from above the waste disposal device.

EXAMPLES OF EMBODIMENTS

Figure 1:
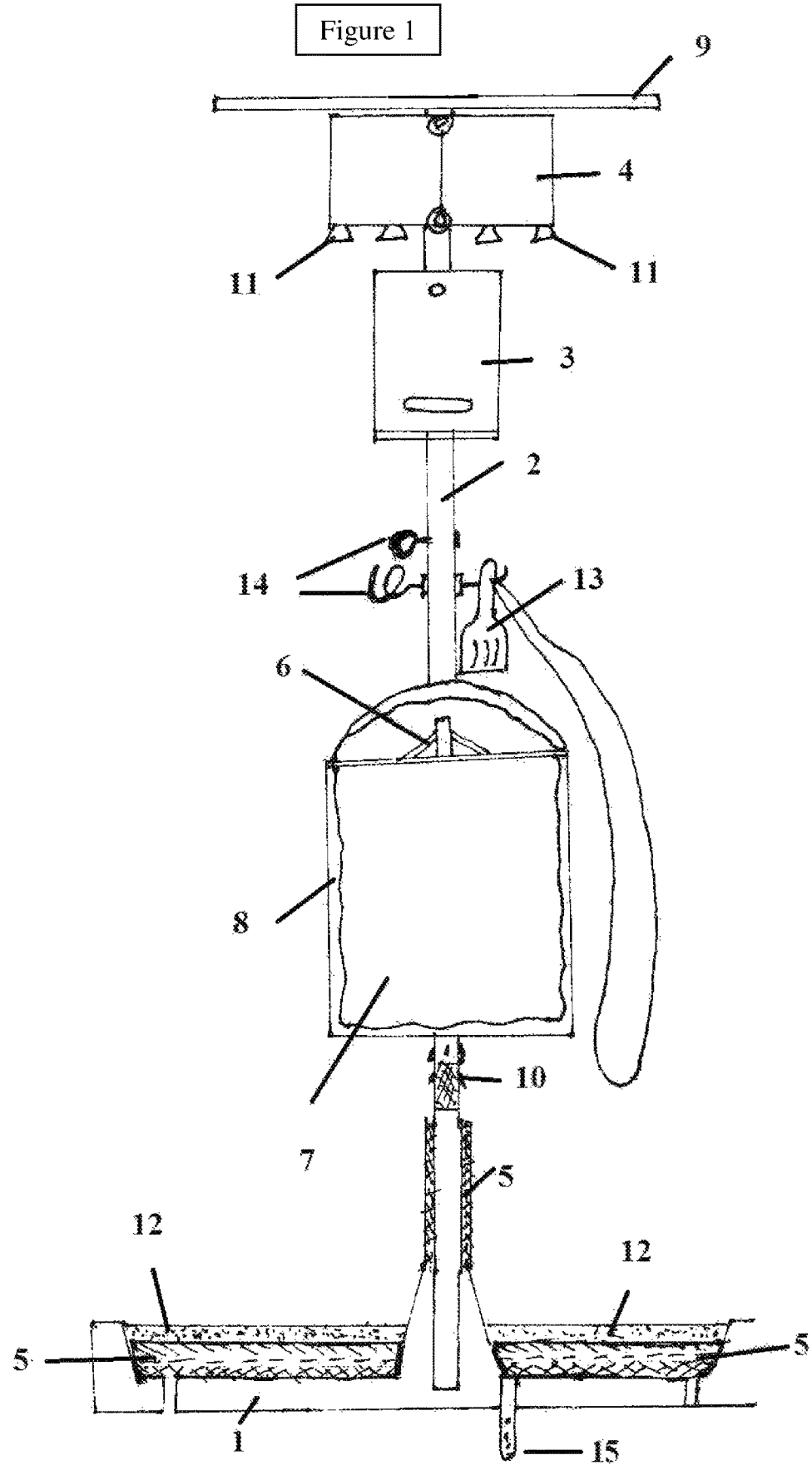
FIG. 1 shows the pet waste disposal device.
Figure 2:
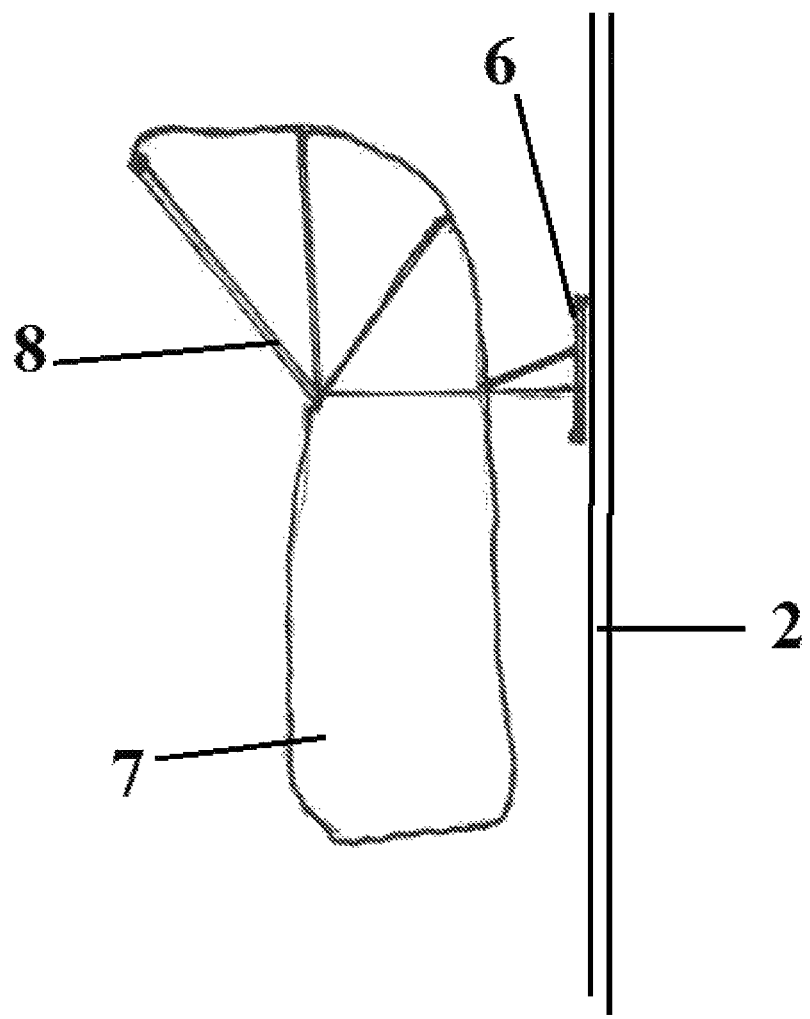
FIG. 2 illustrates the way, how the bag is attached to the frame.

The pet waste disposal device comprises a stabilization pillar 2 mounted in a protection frame 1. The bottom part of the pillar 2 is fitted with a pheromone reservoir 10, which attracts the animals to the device. The top part of the protection frame 1 is fitted with an absorption pad 12; underneath the absorption pad 12, at the bottom part of the stabilization pillar 2 a filtration pad 5 is located, which eliminates disease-carrying germs and decreases the PH of urine. At the bottom of the frame 1, the permeable openings are located, which are used to drain the filtered urine and the rainwater in the surrounding areas. Underneath the filtration pad 5, a probe 15 is located, which checks the level of filtration pad 5 contamination and signals the need to replace the filtration pad 5. The pillar 2 is fitted with a frame 6 with a container 8, in which a bag 7 is attached. The bag 7 is placed in a container 8 to make sure that the bag 7 will not tear. The bag 7 is placed on the frame 6 with the container 8 in such a way, that the bag 7 itself provides a covering, which ensures that neither rain nor snow can get into the bag 7. The pillar 2 is also fitted with a supply bin 3 filled with bags and protection gloves. Mounted to the pillar 2 is a feature 14 used to fasten the leash to the pillar 2 with a possibility to lock it down. The pillar 2 is equipped with a pet waste scooper 13, which is attached to the pillar 2 by a fairly long connective wire. In the top part of the pillar 2, a plate 4 is located, which can be used for advertising or placing information. Above the plate 4, a solar panel 9 is located, which is connected to rechargeable batteries and lighting units 11 used to illuminate the pet waste disposal device and the access road/path or sidewalk, or background illumination of advertising board or information pictogram. The solar panel 9 also serves as a roof, which traps and drains the rainwater from above the waste disposal device.

The invention claimed is:
1. A pet waste disposal device comprising:
 a protection frame having a top part that is fitted with an absorption pad and a filtration pad adapted to eliminate disease-carrying germs and decreases the PH of urine, the protection frame having permeable openings in a bottom part thereof, the openings being configured to drain filtered urine and rainwater into surrounding areas;
 a stabilization pillar mounted in the protection frame, the pillar having a bottom part that is fitted with a pheromone reservoir adapted to attract animals to the device;
 a probe disposed underneath the filtration pad, said probe being configured to check a level of filtration pad contamination and signal a need to replace the filtration pad;
 a frame attached to the pillar, said frame having a container in which a bag is attached to prevent tearing of the bag, the bag being disposed on the frame with the container in such a way that the bag acts as a covering;
 a supply bin attached to the pillar for holding bags and protection gloves;
 a feature mounted to the pillar and being configured for fastening a leash to the pillar and locking the leash;
 a pet waste scooper connected to the pillar by a connective wire;

a plate disposed in a top part of the pillar, said plate being configured for displaying advertising or information; and a solar panel being located above the plate, said solar panel being connected to rechargeable batteries and lighting units used to illuminate the pet waste disposal device and an access road or sidewalk, or for providing background illumination for the plate.

* * * * *